(12) United States Patent
Chen et al.

(10) Patent No.: US 11,788,707 B2
(45) Date of Patent: Oct. 17, 2023

(54) DISPLAY MODULES AND DISPLAY DEVICES

(71) Applicant: Xiamen Tianma Micro-Electronics Co., Ltd., Xiamen (CN)

(72) Inventors: Ruxing Chen, Xiamen (CN); Yaozuo Ke, Xiamen (CN); Zongwei Lin, Xiamen (CN); Wenqi Zhou, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 17/337,104

(22) Filed: Jun. 2, 2021

(65) Prior Publication Data

US 2022/0268421 A1 Aug. 25, 2022

(30) Foreign Application Priority Data

Feb. 20, 2021 (CN) .......................... 202110194036.8

(51) Int. Cl.
*F21V 5/00* (2018.01)
*F21V 5/04* (2006.01)
*H04N 23/57* (2023.01)

(52) U.S. Cl.
CPC .............. *F21V 5/002* (2013.01); *F21V 5/008* (2013.01); *F21V 5/045* (2013.01); *F21V 5/046* (2013.01); *H04N 23/57* (2023.01)

(58) Field of Classification Search
CPC ......... G02F 1/133606; G02F 1/133611; H04N 5/2257; F21V 5/002; F21V 5/008; F21V 5/045; F21V 5/046
See application file for complete search history.

(56) References Cited

U.S. PATENT DOCUMENTS 11,196,849 B2 * 12/2021 Tang ................. G02F 1/133308
2013/0343061 A1 * 12/2013 Liao ........................ H01L 33/58
362/296.01

(Continued)

FOREIGN PATENT DOCUMENTS

CN 108469704 * 5/2018 ....... G02F 1/133603
CN 111198458 * 5/2020 ........... G02F 1/1333

(Continued)

*Primary Examiner* — Zheng Song
(74) *Attorney, Agent, or Firm* — ANOVA LAW GROUP PLLC

(57) ABSTRACT

Display module and display device are provided. The display module includes: a display panel; a backlight module; a through hole; a first optical film, and a light-filling component. An orthographic projection of the first optical film on the display panel is located inside an orthographic projection of the through hole on the display panel. The first optical film is provided with a first microstructure on a side facing the light-filling component, and further includes a first hollowed portion penetrating through the first optical film along the direction perpendicular to the light-exiting surface of the display panel. Light emitted by the light-filling component at least partially enters the first hollowed portion through the first optical film, and is transmitted to the display panel. The first microstructure includes a plurality of annular substructures, and a center of each of the plurality of annular substructures is located in the first hollowed portion.

20 Claims, 10 Drawing Sheets

(56) References Cited

U.S. PATENT DOCUMENTS

| | | | | |
|---|---|---|---|---|
| 2017/0123140 A1* | 5/2017 | Han | ................... | G02B 6/0055 |
| 2021/0072594 A1* | 3/2021 | Zhang | ............... | G02F 1/133603 |
| 2021/0311245 A1* | 10/2021 | Hasegawa | ............ | G02B 6/0068 |
| 2022/0011632 A1* | 1/2022 | Zhang | ............... | G02F 1/133602 |

FOREIGN PATENT DOCUMENTS

| | | | | | |
|---|---|---|---|---|---|
| CN | 111308777 | * | 6/2020 | ....... | G02F 1/133606 |
| JP | 2009199971 | * | 9/2009 | ................ | F21S 2/00 |

* cited by examiner

DISPLAY MODULES AND DISPLAY DEVICES

CROSS-REFERENCES TO RELATED APPLICATION

This application claims the priority of Chinese Patent Application No. 202110194036.8, filed on Feb. 20, 2021, the content of which is incorporated herein by reference in its entirety.

TECHNICAL FIELD

The present disclosure generally relates to the field of display technology and, more particularly, relates to a display module and a display device.

BACKGROUND

As display technologies develop, display panels have a higher and higher screen-to-body ratio, and full screens have received widespread attention due to their narrow-border or even borderless display effects. Presently, the front of display devices such as mobile phones and tablet computers often need to reserve space for photosensitive elements such as front cameras, infrared sensing devices or fingerprint recognition devices. For example, a front camera can be disposed in a lower area of a display panel. The corresponding area can be used to photograph when the front camera is turned on, and to display pictures when the front camera is turned off. Correspondingly, a full screen and a narrow frame effect are achieved.

In existing technologies, to form a light path of a photosensitive element such as a front camera, a high light-transmission area is formed in a display area of the display panel to accommodate the above photosensitive elements. Specifically, the high light-transmission area is usually a through hole after a backlight module is drilled. However, since a portion of the display area corresponding to the drilled position cannot be used for display, it is not easy to realize the narrow frame of the display panel. Further, even if a light source is disposed at the drilled position, the portion of the display area corresponding to the drilled position still has a lower brightness compared to another portion of the display area surrounding the drilled position, which will cause the area to be unable to perform normal screen display and affect the display effect of the display panel.

SUMMARY

One aspect of the present disclosure provides a display module. The display module includes: a display panel; a backlight module at a side away from a light-exiting surface of the display panel; a through hole penetrating through the backlight module along a direction perpendicular to the light-exiting surface of the display panel; and a first optical film and a light-filling component. The first optical film is disposed at a side of the display panel close to the light-filling component and an orthographic projection of the first optical film on the display panel is located inside an orthographic projection of the through hole on the display panel. The first optical film is provided with a first microstructure on a side facing the light-filling component, and further includes a first hollowed portion penetrating through the first optical film along the direction perpendicular to the light-exiting surface of the display panel. Light emitted by the light-filling component at least partially enters the first hollowed portion through the first optical film, and then is transmitted to the display panel. The first microstructure includes a plurality of annular substructures, and a center of each of the plurality of annular substructures is located in the first hollowed portion.

Another aspect of the present disclosure provides a display device. The display device includes a display module. The display module includes: a display panel; a backlight module at a side away from a light-exiting surface of the display panel; a through hole penetrating through the backlight module along a direction perpendicular to the light-exiting surface of the display panel; and a first optical film and a light-filling component. The first optical film is disposed at a side of the display panel close to the light-filling component and an orthographic projection of the first optical film on the display panel is located inside an orthographic projection of the through hole on the display panel. The first optical film is provided with a first microstructure on a side facing the light-filling component, and further includes a first hollowed portion penetrating through the first optical film along the direction perpendicular to the light-exiting surface of the display panel. Light emitted by the light-filling component at least partially enters the first hollowed portion through the first optical film, and then is transmitted to the display panel. The first microstructure includes a plurality of annular substructures, and a center of each of the plurality of annular substructures is located in the first hollowed portion.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
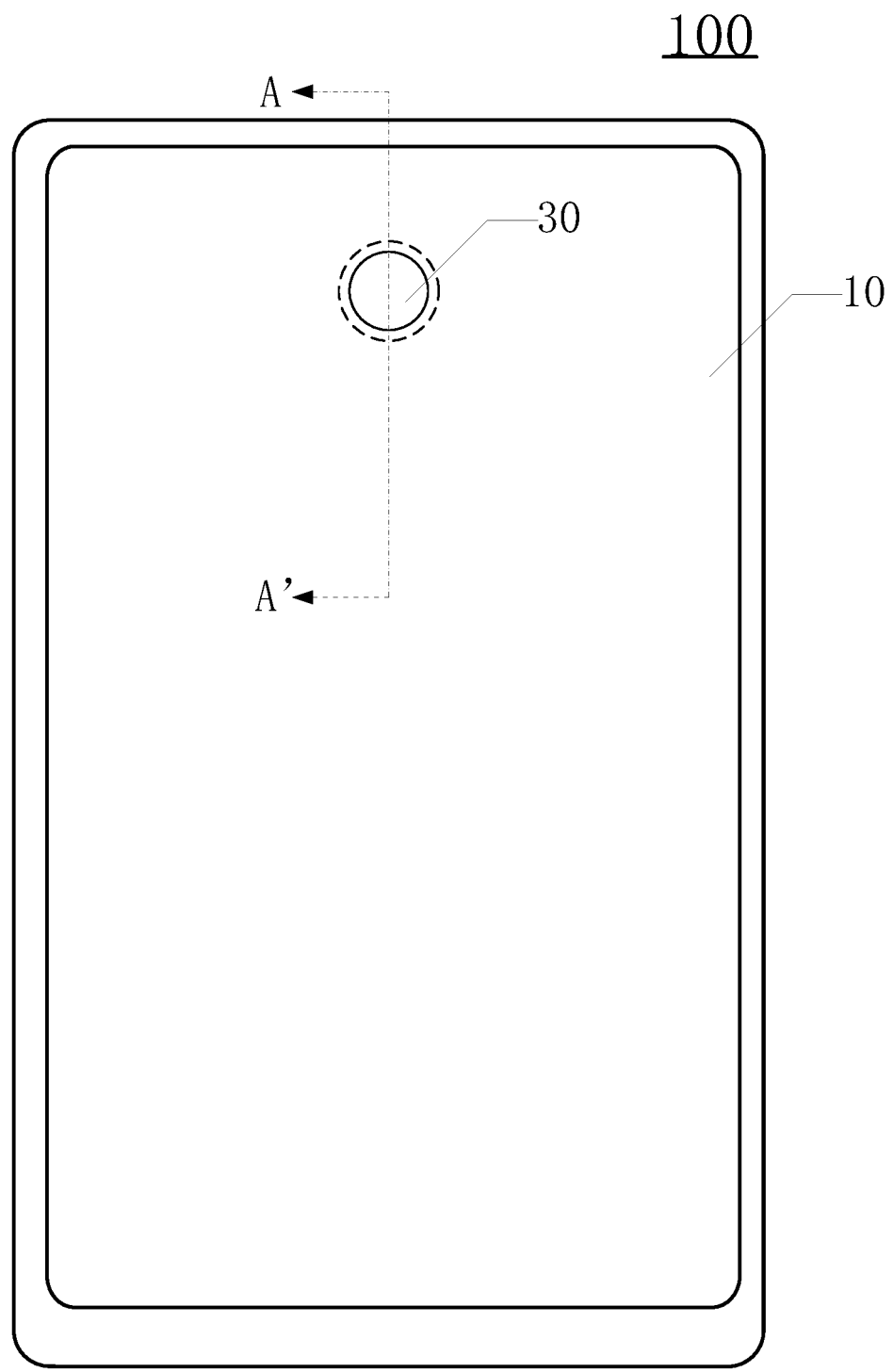
FIG. 1 illustrates an exemplary display module consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width and depth should be considered during practical fabrication.

Figure 2:
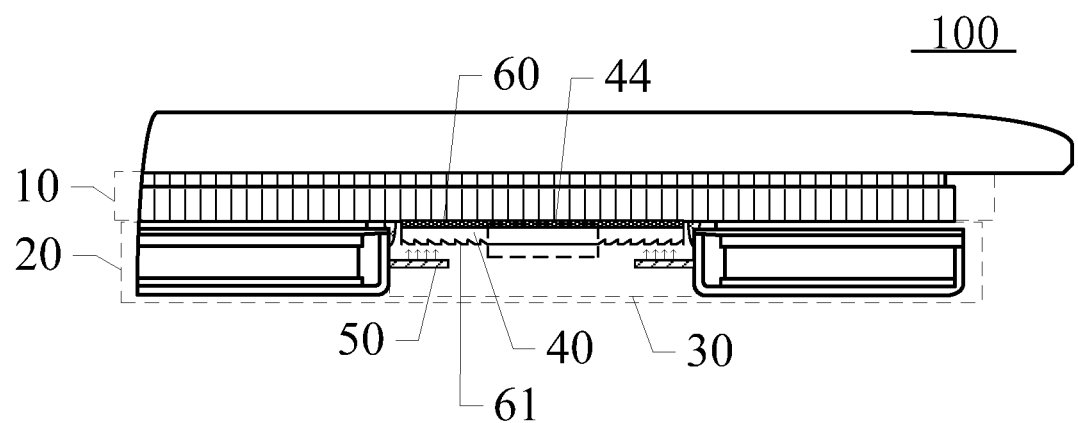
FIG. 2 illustrates a cross-section view of the display module along an A-A' direction in FIG. 1.

The present disclosure provides a display module. FIG. 1 illustrates a display module 100 provided by one embodiment of the present disclosure; FIG. 2 illustrates a cross-section view of the display module along an A-A' direction in FIG. 1; and FIG. 3 illustrates a bottom view of a first optical film of the display module in FIG. 2.

Figure 3:
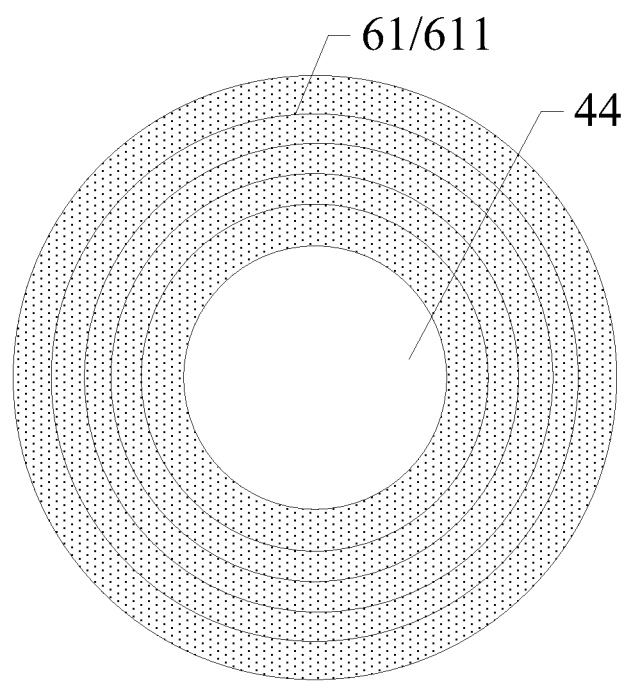
FIG. 3 illustrates a bottom view of a first optical film in FIG. 2.

As illustrated in FIG. 1 to FIG. 3, the display module 100 may include a display panel 10, a backlight module 20, a through hole 30, a first optical film 40, and a light-filling component 50.

The backlight module 20 may be disposed at a side away from a light-exiting surface of the display panel 10. Optionally, the light-exiting surface of the display panel 10 may be a surface of the display panel 10 away from the backlight module 20.

The through hole 30 may penetrate through the backlight module 20 along a direction perpendicular to the light-exiting surface of the display panel 10.

The first optical film 40 may be disposed at a side of the display panel 10 close to the light-filling component 50. An orthographic projection of the first optical film 40 to the display panel 10 may be located inside an orthographic projection of the through hole 30 to the display panel 10. A first microstructure 61 may be provided at a side of the first optical film 40 facing the light-filling component 50. The first optical film 40 may further include a first hollowed portion 44 penetrating through the first optical film 40 along the direction perpendicular to the light-exiting surface of the display panel 10. At least a part of the light emitted by the light-filling component 50 may enter the first hollowed portion 44 through the first optical film 40, and then be transmitted to the display panel 10. The first microstructure 61 may include a plurality of cyclic substructures 611, and centers of the plurality of substructures 611 may all be located inside the first hollowed portion 44.

For description purposes only, the embodiment in FIG. 1 with a rounded rectangular display panel 10 is used as an example to illustrate the present disclosure, and does not limit the scope of the present disclosure. In various embodiments, the display panel 10 may be any suitable structures including rectangle, circle, oval, or another structure with arc edges. Also, FIG. 1 only uses a relative position of the through hole 30 in the display module 100 as an example to illustrate the present disclosure, and does not limit the scope of the present disclosure. In various embodiments, the through hole 30 may be disposed at any suitable position in the display module. The embodiment in FIG. 1 where the through hole 30 is a circular hole is used as an example to illustrate the present disclosure, and does not limit the scope of the present disclosure. In various embodiments, the through hole 30 may be any suitable shape including a square, or a racetrack, and may be any suitable size, which can be configured according to actual needs. The embodiment shown in FIG. 2 only schematically shows a relative positional relationship diagram of the display panel 10, the backlight module 20, the through hole 30, the first optical film 40, and the light-filling component 50, and does not represent the actual size. The light-filling component 50 may include a mini-LED or a micro-LED, which is not limited in the present disclosure. The area corresponding to the first hollowed portion 44 in the first optical film 40 may be the area corresponding to the dashed frame indicated by the reference number 44 in FIG. 2. The style diagram of the first optical film 40 in FIG. 2 can be referred to FIG. 3. The embodiment in FIG. 3 showing the plurality of cyclic substructures 611 in the first microstructure 61 of the first optical film 40 is used as an example to illustrate the present disclosure. It does not limit the scope of the present disclosure and also does not represent the actual quantity and size of the plurality of substructures 611.

In the existing technologies, when a through hole is provided on a backlight module, the through hole transmits light to a camera in a light sensing stage including a photographing stage, and the area corresponding to the through hole may be used to display in a display stage. Since the light provided by the backlight module cannot be directly provided to the area corresponding to the through hole, the display brightness of a portion of the display area corresponding to the through hole and a remaining portion of the display areas are greatly different in the display stage, which affects the display effect of the full screen.

In the display module 100 provided by the present disclosure, the first optical film 40 and the light-filling component 50 may be provided in the through hole 30 corresponding to the backlight module 20. Along the direction perpendicular to the light-exiting surface of the display panel, the first optical film may be located between the light-filling component and the display panel 10. The light-filling component 50 may be used to provide a light source. When a functional component including a camera is provided in the through hole 30, the light-filling component 50 may be disposed at the functional component or at a sidewall of the through hole 30. The first microstructure 61 may be provided at the side of the first optical film 61 facing the light-filling component 50 and the first optical film 40 may include the first hollowed portion 44. When a functional component including a camera is provided in the through hole 30, an orthographic projection of the functional component to the light-exiting surface of the display panel 10 may overlap the first hollowed portion 44, to prevent the first optical film from affecting the light entering the functional component in the light sensing stage.

In the display stage, at least part of the light emitted by the light-filling component 50 may be injected into the first hollowed portion 44 through the first microstructure 61 on the first optical film 40, and then be transmitted to the portion of the display area corresponding to the position of the through hole 30 in the display panel 10. That is, in the present disclosure, the first microstructure 61 may be arranged on the first optical film 40, and the optical path of the light provided by the light fill component 50 may be changed by the first microstructure 61, such that more light may be injected toward the area corresponding to the first hollowed portion 44. Therefore, display brightness of the portion of the display area corresponding to the through hole 30 in the display module 100 may be increased, to reduce the brightness difference between the portion of the display area corresponding to the through hole 30 and the remaining portion of the display area in the display stage. The uniformity of the display brightness of the normal display area of the display module 100 and the portion of the display area corresponding to the through hole 30 may be improved, thereby helping to improve the display effect of the display module 100 in the display stage. At the same time, since the area corresponding to the through hole 30 can play a display role in the display stage, it may be also beneficial to increase the screen-to-body ratio of the display module 100 to realize the narrow frame design of the display module 100.

As illustrated in FIG. 2 and FIG. 3, in the display module 100, the first microstructure 61 at the side of the first optical film 61 facing the light-filling component 50 may include the plurality of cyclic substructures 611, and a center of each of the plurality of cyclic substructures 611 may be located inside the first hollowed portion 44. That is, each of the plurality of cyclic substructures 611 may be disposed surrounding the first hollowed portion 44, such that the cyclic area of the first optical film 40 may be provided with the plurality of substructures 611. Since the plurality of substructures 611 is a core structure for changing the optical path of the light provided by the light fill component 50, when each of the plurality of substructures 611 is an annular shape surrounding the first hollowed portion 44 and the light from the light fill component 50 injects on the first optical film 40, each region of the first optical film 40 facing the light-filling component 50 may all be provided with the plurality of substructures 611, such that the light incident on each region of the first optical film 40 may be deflected to change the optical path and a portion of the light may be transmitted into the first hollowed portion 44. When the plurality of substructures is not a continuous structure, a partial area of the first optical film may not be provided with substructures, and the light incident on the partial area of the first optical film may not be deflected by the substructure. The light may not be used effectively and the light incident on the first hollowed portion nay not be uniform. In the present disclosure, each of the plurality of substructures 611 may be an annular shape surrounding the first hollowed portion 44, such that the light from the light fill component and incident on different areas of the first optical film may be deflected effectively. The utilization efficiency of the light and the uniformity of the light incident on the first hollowed portion may be improved.

Optionally, in one embodiment, as illustrated in FIG. 2 and FIG. 3, the center of each substructure 611 of the plurality of substructures 611 may coincide with the center of the first hollowed portion 44, that is, in the viewing angle shown in FIG. 3, each substructure 611 and the first hollowed portion 44 may be configured as a concentric structure. When the plurality of substructures 611 in the first microstructure 61 are formed on the first optical film 40, the first hollowed portion 44 may be used as a reference to manufacturing each substructure 611, which is beneficial to simplify the manufacturing difficulty of the first optical film 40 and improve the production efficiency.

Optionally, each substructure 611 of the plurality of substructures 611 may be evenly arranged on the surface of the first optical film 40 facing the light-filling component 50, that is, the distance between any two adjacent substructures 611 of the plurality of substructures 611 may be equal, which is beneficial to improve the uniformity of the light incident on the first hollowed portion 41 from the plurality of substructures 611. It should be noted that the distance between two adjacent substructures 611 of the plurality of substructures 611 may refer to the distance between corresponding parts of two adjacent substructures 611 of the plurality of substructures 611. For example, when each substructure 611 of the plurality of substructures 611 is embodied as a sawtooth structure, the distance between two adjacent substructures 611 of the plurality of substructures 611 may be embodied as the distance between the tips of the two saw teeth of the two adjacent substructures 611 of the plurality of substructures 611.

In one embodiment, the first optical film 40 may be fixed to the light-filling component 50, or may be fixed to the inner wall of the through hole 30. The fixing method can be glue or other feasible fixing methods, as long as the first optical film 40 is prevented from moving freely in the through hole 30. The present disclosure has no limit on this. Optionally, the first optical film 40 may be an annular-shaped optical film, and the first hollowed portion 44 may be located in the middle of the first optical film 40.

Figure 4:
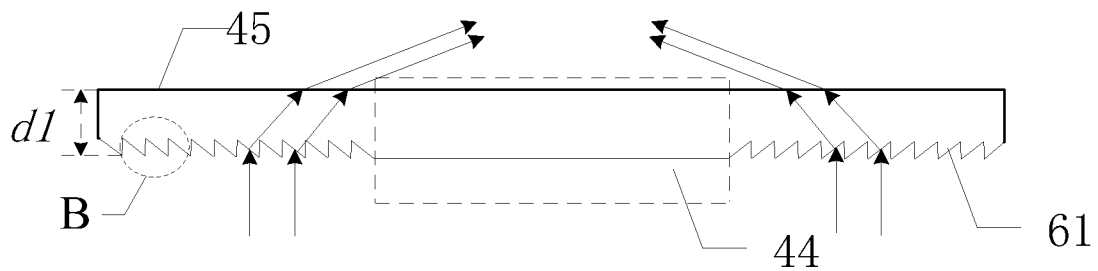
FIG. 4 illustrates an exemplary first optical film consistent with various disclosed embodiments in the present disclosure.
Figure 5:
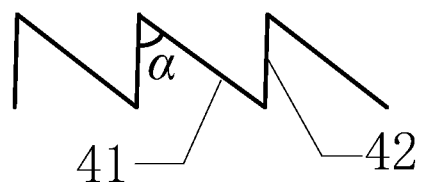
FIG. 5 illustrates a local view of a part B of the first optical film in FIG. 4.

FIG. 4 illustrates a structure of an exemplary first optical film provided by one embodiment of the present disclosure, and FIG. 5 illustrates a locally enlarged diagram of a part B of the first optical film in FIG. 4. As illustrated in FIG. 2 to FIG. 5, the first microstructure 61 may be a sawtooth first microstructure. The sawtooth first microstructure may include at least one first side surface 41. The at least one side surface 41 may be inclined in a direction away from the first hollowed portion 44, and may be a plane.

Specifically, in one embodiment illustrated in FIG. 2 to FIG. 5, the first microstructure 61 may be the sawtooth first microstructure. The sawtooth first microstructure may include the first side surface 41. In some other embodiments, the sawtooth first microstructure may include a plurality of first side surface. The at least one side surface 41 may be inclined in the direction away from the first hollowed portion 44. As illustrated in FIG. 5, a direction in which the first side surface 41 faces away from the first hollowed portion 44 may be a D1 direction, and may be inclined at a certain angle toward a direction close to the display panel 10. The inclined angle may be used to change the optical path of the light incident on the sawtooth first microstructure. The light whose optical path is changed may finally enter the first hollowed portion 44 at least partially, and may be used to enhance the light of the first hollowed portion 44, which is beneficial to the display brightness uniformity of the display panel 10. Further, the first side surface 41 of the sawtooth first microstructure may be configured as a plane, to effectively change the optical path of the light and simplify the manufacturing process of the sawtooth first microstructure.

In one embodiment, as illustrated in FIG. 4 and FIG. 5, the sawtooth first microstructure 61 may further include at least one second side surface 42. The second side surface 42 may be perpendicular to the light-exiting surface of the display panel. The first side surface 41 may deviate from the at least one second side surface 42 at an acute angle α along a direction pointing to the first hollowed portion 44.

Specifically, in one embodiment illustrated in FIG. 2 to FIG. 5, the first microstructure 61 may further include one second side surface 42. In some other embodiments, the first microstructure 61 may further include a plurality of second side surfaces 42. The first side surface 41 may deviate from the second side surface 42 at an acute angle α along the direction pointing to the first hollowed portion 44. Optionally, the second side surface 42 may be perpendicular to the light-exiting surface of the display panel 10. Correspondingly, it may be hard for the light incident into the first microstructure to enter the first microstructure through the second side surface 42. The second side surface 42 may be used to prevent the light incident into the first microstructure from being transmitted to a direction away from the first hollowed portion 44 after the optical path is changed at the second side surface 42. Loss of the light may be avoided. Correspondingly, the setup of the second side surface 42 may not affect the optical path of the light incident into the first microstructure 61, such that the light may be transmitted to the first hollowed portion through the first side surface 41 as much as possible. The amount of light input into the portion of the display area corresponding to the first hollowed portion 44, and the display brightness of the display area corresponding to the through hole 30 may be further increased, thereby further improving the uniformity of the display brightness of each area of the display module 100.

In one embodiment, as illustrated in FIG. 2 to FIG. 5, a side surface 45 of the first optical film 40 away from the light-filling component 50 may be parallel to the light-exiting surface of the display panel 10. The first side surface 41 and the second side surface 42 may be connected to form a plurality of saw teeth. In any two adjacent saw teeth of the plurality of saw teeth, adjacent first side surface 41 and second side surface 42 may be connected to each other.

Specifically, in the first optical film 40 provided in FIGS. 4 and 5, the first side surface 41 and the second side surface 42 of the sawtooth first microstructure 61 may be connected to form a plurality of saw teeth, and any two adjacent saw teeth of the plurality of saw teeth may be directly connected. That is, the adjacent first side surface 41 and the second side surface 42 may be directly connected among the two adjacent saw teeth, and no other structure may be provided in the middle, such that the plurality of saw teeth in the first microstructure 61 may form a continuous sawtooth structure. As illustrated in FIG. 2, when the light from the light-filling component 50 is incident into the sawtooth first microstructure 61 of the first optical film 40, most of the light may directly enter the inclined first side surface 41. The first side surface 41 may change the transmission direction of the light such that the light is directed toward the first hollowed portion 44 and directed toward the display panel 10. Since the amount of light transmitted to the first hollowed portion 44 is increased, the display brightness of the display area of the display panel 10 corresponding to the through hole 30 may be improved, and thus the difference of the display brightness between the different display areas of the display panel 10 may be reduced, to improve the display effect of the display module 100.

In one embodiment, as illustrated in FIG. 2 to FIG. 5, an angle between the second side surface 42 and the first side surface 41 may be about 20° to about 40°. For example, the angle between the second side surface 42 and the first side surface 41 may be 25°, 30°, or 35°.

In the present disclosure, the angle between the first side surface 41 and the second side surface 42 in the sawtooth first microstructure 61 may be about 20° to about 40°, and the second side surface 42 may be perpendicular to the light-exiting surface of the display panel 10, while the first side surface 41 may be an inclined surface. Correspondingly, the angle between the first side surface 41 and the second side surface 42 may be equivalent to the angle at which the first side surface 41 is inclined with respect to the second side surface 42. The light emitted by the light-filling component 50 may be transmitted to the inclined first side 41. The direction of the light emitted from the first side surface 41 may be related to the inclination angle of the first side surface 41. When the angle between the first side surface 41 and the second side surface 42 is less than 20° or greater than 40°, the light may not be converged in the area corresponding to the first hollowed portion 44. The present disclosure may set the angle between the first side surface 41 and the second side surface 42 to 20°~40°, which helps to ensure that most of the light emitted from the second side surface 42 will enter the area corresponding to the first hollowed portion 44 to improve the display brightness of the display area corresponding to the through hole 30 in the display stage.

In one embodiment, a thickness of the first optical film 40 along the direction perpendicular to the light-exiting surface of the display panel 10 may be about 0.1 mm to about 0.15 mm.

Specifically, in one embodiment, saw teeth in the sawtooth first microstructure 61 on the first optical film 40 are directly connected in pairs, and the thickness d1 of the first optical film 40 can be set to 0.1 mm-0.15 mm. Increasing of the difficulty of forming the sawtooth first microstructure 61 and influence on the normal deflection of the light path induced by the too small thickness (less than 0.1 mm) of the first optical film 40 may be avoided. Further, a large space occupied by the first optical film 40 in the through hole 30 induced by a too large thickness (larger than 0.15 mm) of the first optical film 40 may be avoided, too. Therefore, in the present disclosure, the thickness of the first optical film 40 may be set to about 0.1 mm to about 0.15 mm, which is beneficial to reduce the difficulty of manufacturing the first optical film 40 and ensure that the light is normally deflected in the sawtooth first microstructure 61 of the first optical film 40. The space occupied by the first optical film 40 in the through hole 30 may also be reduced.

Figure 6:
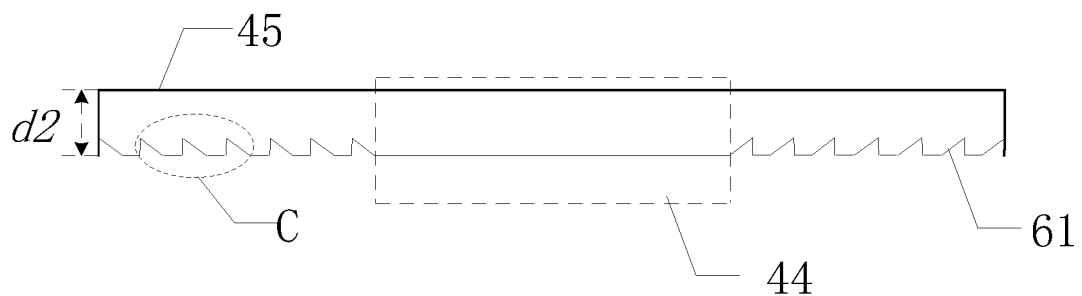
FIG. 6 illustrates another exemplary first optical film consistent with various disclosed embodiments in the present disclosure.
Figure 7:
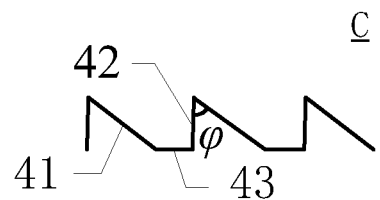
FIG. 7 illustrates a local view of a part C of the first optical film in FIG. 6.

The present disclosure also provides another optical film. FIG. 6 illustrates another first optical film provided by another embodiment of the present disclosure and FIG. 7 illustrates a local view of a part C of the first optical film in FIG. 6. As shown in FIG. 6 and FIG. 7, a third side surface 43 may be provided between the first side surface 41 and the second side surface 42, and may be parallel to the light-exiting surface of the display panel 10. The third side surface 43 may be connected to both of the first side surface 41 and the second side surface 42. A side surface of the first optical film 40 away from the light-filling component 50 may be parallel to the light-exiting surface of the display panel 10.

Figure 8:
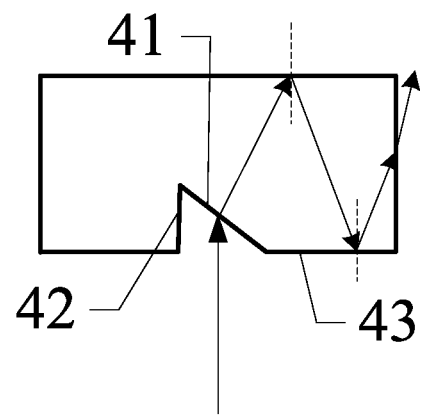
FIG. 8 illustrates a schematic diagram of a light path in which light is transmitted in the sawtooth first microstructure corresponding to FIG. 6.

Specifically, FIG. 6 and FIG. 7 show another first optical film 40 provided by the present disclosure. Different from the first optical film 40 in FIG. 4 and FIG. 5, in the present embodiment shown in FIG. 6 and FIG. 7, the third side surface 43 may be provided in the sawtooth first microstructure 61. The third side surface 43 may be parallel to the light-exiting surface of the display panel 10, and may be used to connect the adjacent first side surface 41 and the second side surface 42. FIG. 8 shows a schematic diagram of a light path in which light is transmitted in the sawtooth microstructure corresponding to FIG. 6. As illustrated in FIG. 8, the light incident on the sawtooth first microstructure 61 may pass through the first side surface 41 to change the light path and then enters the side surface of the optical film 40 away from the light-filling component 50. At least part of the light may be totally reflected on the side surface of the optical film 40 away from the light-filling component 50 and directed toward the third side surface 43. The light may be reflected by the third side surface 43 and then enter the through hole 30. It is understandable that the condition for total reflection of light on the surface of the first optical film 40 away from the light-filling member 50 is that the incident angle of the light entering the surface is greater than the critical angle. For example, from an optically dense medium to an optically thinner medium, the angle at which total reflection occurs can be calculated according to the refractive index of the sawtooth microstructure, and then the angle between the first side 41 and the second side 42 of the sawtooth microstructure can be determined accordingly. Through the above-mentioned series of conversions of the light path, as much light as possible may be injected into the through hole 30, to improve the display brightness of the display area corresponding to the through hole 30 in the display stage. Therefore, the uniformity of the display brightness in the different display areas of the display module 100 may be improved.

In one embodiment, as illustrated in FIG. 6 and FIG. 8, an angle between the second side surface 42 and the first side surface 41 φ may be about 29.7° to about 35.2°. When the display module adopts the first microstructure in FIG. 6 to FIG. 8, the angle between the second side surface 42 and the first side surface 41 φ may be set to about 29.7° to about 35.2°, such that the angle between the second side surface 42 and the first side surface 41 satisfies the condition for total reflection of light. Correspondingly, as much light as possible may be injected into the display area corresponding to the through hole 30, to improve the display brightness of the display area corresponding to the through hole 30. For example, the angle between the second side surface 42 and the first side surface 41 φ may be set to 20°, 31°, 32°, 33°, 34°, or 35°.

In some embodiments, the first optical film 40 may be made of a material including polycarbonate (PC), polymethyl methacrylate (PMMA), or glass with a refraction index of about 1.4 to 1.6. For example, when the first optical film 40 is made of polycarbonate, the refraction index may be about 1.526, and the angle between the second side surface 42 and the first side surface 41 may be determined to be about 33.15°. When the first optical film 40 is made of polymethyl methacrylate, the refraction index may be about 1.592, and the angle between the second side surface 42 and the first side surface 41 may be determined to be about 34.89°. When the first optical film 40 is made of glass, the refraction index may be about 1.523, and the angle between the second side surface 42 and the first side surface 41 may be determined to be about 33.06°. Correspondingly, in the present disclosure, the angle between the second side surface 42 and the first side surface 41 φ may be set to about 29.7° to about 35.2°. Most of the light incident on the first optical film 40 may be totally reflected by the first optical film 40, and the light which is totally reflected may be directed into the through hole 30. The light loss may be effectively reduced, and the effective utilization ratio of the light from the light-filling component 50 may be improved. Further, the display brightness of the display area corresponding to the through hole 30 and the uniformity of the display brightness in the different display areas of the display module 100 may be improved.

In one embodiment, when the microstructure of the first optical film 40 adopts the structure shown in FIG. 6 to FIG. 8, the thickness d2 of the first optical film 40 along the direction perpendicular to the light-exiting surface of the display panel 10 may be about 0.05 mm to about 0.1 mm.

Specifically, when the thickness of the first optical film 40 exceeds 0.1 mm, because other components need to be placed in the through hole 30, the thickness of the display module 100 may be increased, which is not conducive to the thinning of the display module 100. When the thickness of the first optical film 40 is less than 0.05 mm, the first optical film 40 will be thinner, which will increase the difficulty of manufacturing the first optical film 40. Therefore, in the present disclosure, the thickness of the first optical film 40 may be set to 0.05 mm to 0.1 mm, to avoid increasing the thickness of the display module 100 while realizing light supplementation. The difficulty of manufacturing the first optical film 40 may also be simplified. Optionally, the thickness of the first optical film 40 may be set to 0.06 mm, 0.07 mm, 0.08 mm, or 0.09 mm.

Figure 9:
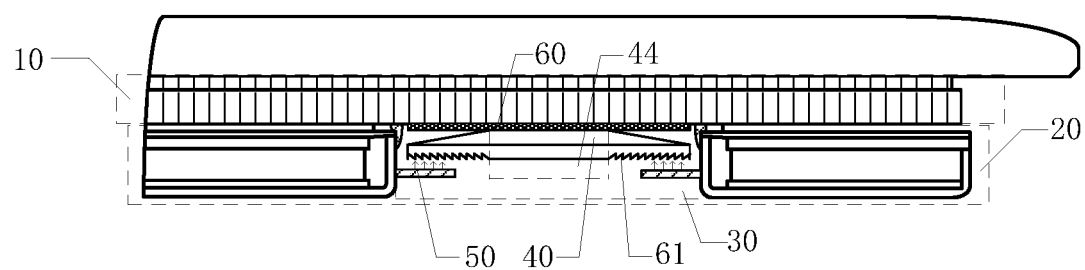
FIG. 9 illustrates another cross-section view of the display module along an A-A' direction in FIG. 1.
Figure 10:
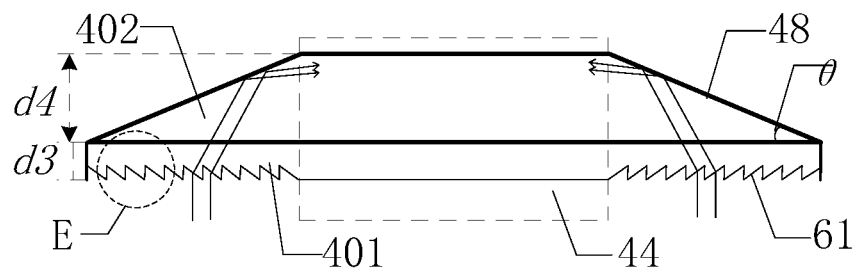
FIG. 10 illustrates a first optical film corresponding to the display module in FIG. 9 consistent with various disclosed embodiments in the present disclosure.
Figure 11:
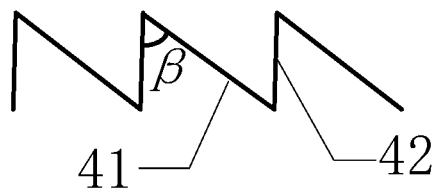
FIG. 11 illustrates a local view of a part E of the first optical film in FIG. 10.

FIG. 9 illustrates another cross-section structure of the display module 100 provided by another embodiment of the present disclosure, along the A-A' direction in FIG. 1, and FIG. 10 shows a first optical film corresponding to the display module 100 in FIG. 9, and FIG. 11 shows a local structure of the part E in FIG. 10. As illustrated in FIG. 9, FIG. 10, and FIG. 11, the first optical film 40 may include a first sub film layer 401 and a second sub film layer 402. The second sub film layer 402 may be disposed at a side of the first sub film layer 401 close to the display panel 10.

The first sub film layer 401 may be provided with a sawtooth first microstructure 61 at a side of the first sub film layer 401 close to the light-filling component 50. The sawtooth first microstructure 61 may be provided with a first side surface 41 between two adjacent second surfaces 42. The second sub film layer 402 may include a first reflecting surface 48 and the first reflecting surface 48 may deviate from a plane of second side surfaces 42 away from the first hollowed portion 44 at an acute angle.

FIG. 9 and FIG. 10 illustrate another structure of the first optical film 40 provided by the present disclosure. In the present embodiment, the first optical film 40 may include the first sub film layer 401 and the second sub film layer 402 stacked along the direction perpendicular to the light-exiting surface of the display panel 10. The first sub film layer 401 may be disposed between the display panel 10 and the second sub film layer 402. The first sub film layer 401 may be provided with the sawtooth first microstructure 61 at the side of the first sub film layer 401 close to the light-filling component 50. The sawtooth first microstructure 61 may have a structure shown in FIG. 11. The sawtooth first microstructure 61 may be provided with a first side surface 41 between two adjacent second surfaces 42. The second sub film layer 402 may include the first reflecting surface 48 and the first reflecting surface 48 may deviate from the plane of the second side surfaces 42 away from the first hollowed portion 44 at an acute angle. The light from the light-filling component 50 may first be incident on the first sub film layer 401, and then may be refracted to the first reflecting surface 48 through the sawtooth first microstructure 61. Correspondingly, the light may be reflected into the first hollowed portion 44 by the first reflecting surface 48. The sawtooth microstructure 61 on the first sub film layer 401 and the first reflecting surface 48 on the second sub film layer 402 may cooperate, such that the light from the light-filling component 50 enters the display area corresponding to the through hole 30 smoothly. The display brightness of the display area corresponding to the through hole 30 and the uniformity of the display brightness in the different display areas of the display module 100 may be improved.

In one embodiment, the angle β between the second side surface 42 and the first side surface 41 may set to about 20° to about 30°.

As illustrated in FIG. 9 to FIG. 11, in one embodiment, the first reflecting surface at the second sub film layer 402 and the light-exiting surface of the display panel 10 may have an angle, and the angle β between the second side surface 42 and the first side surface 41 may be configured according to the angle between the first reflecting surface at the second sub film layer 402 and the light-exiting surface of the display panel 10. By setting the angle β between the second side surface 42 and the first side surface 41 to about 20° to about 30°, the light incident on the sawtooth microstructure may be directed to the first reflecting surface 48 after the light path is changed by the first side surface 41 (that is, after refraction), and then at least a portion of the light may be directed into the first hollowed portion 44 after the light path is changed by the first reflecting surface 48. The light incident on the first reflecting surface 48 should be totally reflected as much as possible. When the angle between the second side surface 42 and the first side surface 41 is greater than 30° or less than 20°, the portion of the light incident on the first reflecting surface 48 being total reflected light may decrease, and ultimately the light incident into the first hollowed portion 44 may decrease. The conversion rate of the light incident to the first hollowed portion 44 may be reduced. Optionally, the angle β between the second side surface 42 and the first side surface 41 may be set to 24°, 26°, 28°, which can effectively make as much light as possible inject into the first hollowed portion 44 and improve the display brightness uniformity of the display panel 10.

As illustrated in FIG. 10, in one embodiment, the acute angle θ of the angles between the extension surface of the first reflecting surface and the light-exiting surface of the display panel 10 may be set to 35°-40°.

Specifically, as illustrated in FIG. 10, the second sub film layer 402 may be provided with the first reflective surface 48 on the side close to the display panel 10, and the acute angle θ of the angles between the extension surface of the first reflecting surface and the light-exiting surface of the display panel 10 may be set to 35°-40°. When θ is greater than 40°, the reflection effect of the first reflective surface 48 may be affected. When θ is less than 40°, the thickness of the second sub film layer 402 may be too small, affecting basic function of the second sub film layers 402. The acute angle θ of the angles between the extension surface of the first reflecting surface and the light-exiting surface of the display panel 10 may be set to 35°-40°, such that the light emitted by the light-filling component 50 may enter the first hollowed portion 44 as much as possible, which can effectively improve the uniformity of the display brightness of the display panel 10.

In one embodiment, along the direction perpendicular to the light-exiting surface of the display panel 10, a height d3 of the first sub film layer 401 may be about 0.08 mm to about 0.12 mm, and a height d4 of the second sub film layer 402 may be about 0.38 mm to about 0.42 mm.

Specifically, in one embodiment illustrated in FIG. 10, along the direction perpendicular to the light-exiting surface of the display panel 10, the height d3 of the first sub film layer 401 may be about 0.08 mm to about 0.12 mm, and the height d4 of the second sub film layer 402 may be about 0.38 mm to about 0.42 mm. For example, the height d3 of the first sub film layer 401 may be set to about 0.1 mm or 0.11 mm, and the height d4 of the second sub film layer 402 may be set to 0.39 mm or 0.41 mm. When the height d3 of the first sub film layer 401 is larger than 0.12 mm and the height d4 of the second sub film layer 402 is larger than 0.42 mm, because other components need to be placed in the through hole 30, the thickness of the display module 100 may be increased, which is not conducive to the thinning of the display module 100. When the height d3 of the first sub film layer 401 is less than 0.08 mm and the height d4 of the second sub film layer 402 is less than 0.38 mm, the first optical film 40 will be thinner, which will increase the difficulty of manufacturing the first optical film 40.

In one embodiment, the refractive index of the first sub film layer 401 may be about 1.4 to 1.6, and the refractive index of the second sub film layer 402 may be about 1.4 to about 1.6.

Specifically, as illustrated in FIG. 10, the refractive index of the first sub film layer 401 may be about 1.4 to 1.6, and the refractive index of the second sub film layer 402 may be about 1.4 to about 1.6. For example, the refractive index of the first sub film layer 401 may be set to 1.5, and the refractive index of the second sub film layer 402 may be set to 1.5. The first sub film layer 401 at this refractive index may be made of a material including photosensitive resin, which has high light sensitivity and can improve the manufacturing precision of the optical film. The second sub film layer 402 with this refractive index here may be made of a material including polyester resin, which has the advantages of high transparency, UV blocking, and good gloss. The above materials can better realize the functions of the first sub film layer 401 and the second sub film layer 402. According to the basic functions that the first sub film layer 401 and the second sub film layer 402 need to meet including the requirements for transmitting light and an optically dense medium with a refractive index greater than that of air, the refractive index of the first sub film layer 401 may be about 1.4 to 1.6, and the refractive index of the second sub film layer 402 may be about 1.4 to about 1.6. When the refractive index of the first sub-film layer 401 is greater than 1.6 or less than 1.4, and the refractive index of the second sub film layer 402 is greater than 1.6 or less than 1.4, the first sub-layer 402 has a refractive index greater than 1.6 or less than 1.4. After the optical film composed of the first sub film layer 401 and the second sub film layer 402 changes the light path, the light entering the first hollowed portion 44 may decrease, which reduces the efficiency of light conversion to the first hollowed portion 44. Further, the refractive index of the first sub film layer 401 and the second sub film layer 402 may be set to be similar, and the light path of the light incident from the first sub-film layer 401 to the second sub-film layer 402 may hardly change, that is, almost no refraction may occur. The light path incident from the first sub-film layer 401 to the second sub-film layer 402 may be almost unaffected. At this time, the change of the light path induced by the difference in the materials of the first sub-film layer 401 and the second sub-film layer 402 may be unnecessary to be considered. Optionally, the first sub-film layer 401 and the second sub-film layer 402 can be made of the same material.

In one embodiment, as illustrated in FIG. 2 and FIG. 9, a diffuser 60 may be disposed at the side of the display panel 10 close to the light-filling component 50. The orthographic projection of the first optical film 40 on the display panel 10 may be located inside an orthographic projection of the diffuser 60 on the display panel 10. That is, the diffuser 60 and the optical film may have the same shape, both be annular-shaped. The annular-shaped diffuser 60 also may have a hollow part. The hollow part may be arranged such that the setting of the diffuser 60 may not affect the operation of the functional device. The arrangement of the diffuser 60 may make the light after passing through the diffuser 60 more uniform.

The above description shows embodiments in which the first optical film is arranged in the through hole, or the first optical film and the diffuser are arranged at the same time. In some other embodiments of the present disclosure, other optical films may be disposed in the through hole, which will be further described below in conjunction with the drawings.

Figure 12:
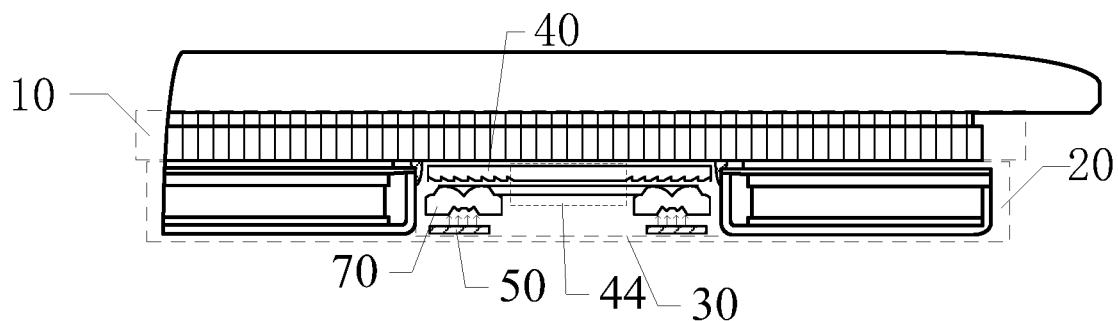
FIG. 12 illustrates another cross-section view of the display module along an A-A' direction in FIG. 1.
Figure 13:
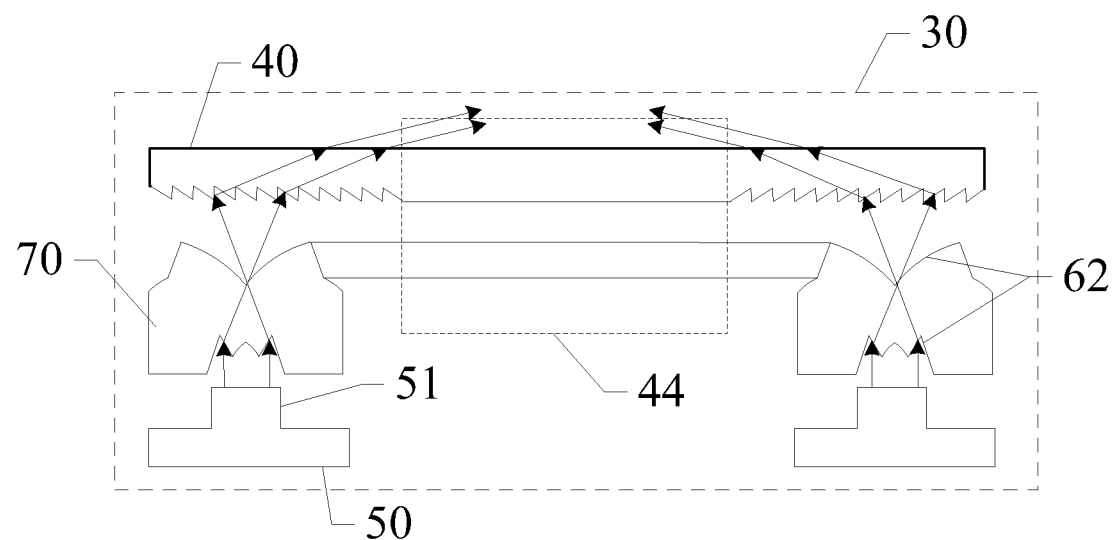
FIG. 13 illustrates a relative positional relationship of the first optical film, the second optical film, and a light-filling component, consistent with various disclosed embodiments in the present disclosure.

In another embodiment, the display module 100 may further include a second optical film 70. FIG. 12 illustrates another cross-section view of the display module along an A-A' direction in FIG. 1 provided by the present embodiment and FIG. 13 illustrates a relative position relationship of the first optical film, the second optical film, and the light-filling component. As illustrated in FIG. 12 and FIG. 13, the second optical film 70 may be disposed between the light-filling component 50 and the first optical film 40 along the direction perpendicular to the light-exiting surface of the display panel 10, and may be located inside the through hole 30. The second optical film 70 may be provided with a second microstructure 62. At least a portion of the light from the light-filling component 50 may pass through the second microstructure 62 to enter the first optical film 40.

Specifically, in the present embodiment as illustrated in FIG. 12 and FIG. 13, the first optical film 40 and the second optical film 70 may be provided in the display module 100. The second optical film 70 may be disposed between the light-filling component 50 and the first optical film 40 along the direction perpendicular to the light-exiting surface of the display panel 10. The light from the light-filling component 50 may pass through the second microstructure 62 to enter the first optical film 40.

Figure 14:
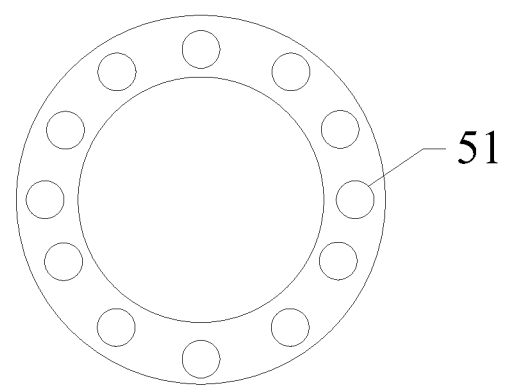
FIG. 14 illustrates an exemplary light-filling component consistent with various disclosed embodiments in the present disclosure.

FIG. 14 illustrates a structure of the light-filling component 50 provided by one embodiment of the present disclosure. The light-filling component 50 may include a plurality of light-filling lamps 51. The plurality of light-filling lamps 51 may not be continuously arranged, and there may be an interval region between two adjacent light-filling lamps 51 of the plurality of light-filling lamps 51. The light in positions corresponding to interval regions may be weaker than the light in the area directly above the plurality of light-filling lamps 51. Therefore, the light provided by the light-filling component 50 may have uneven brightness. For example, the brightness may be higher at the position directly opposite to the plurality of light-filling lamps 51, and the brightness may be lower at the position corresponding to the interval regions. To avoid this phenomenon, as illustrated in FIGS. 12 and 13, the present embodiment may provide the second optical film 70 between the light-filling component 50 and the first optical film 40, and the second optical film 70 may be provided with the second microstructure 62. The second microstructure 62 may be used to uniformly disperse the light emitted by the plurality of light-filling lamps 51 and then transmit it to the first optical film 40. Finally, the light may be transmitted it from the first optical film 40 to the first hollowed portion 44. The light provided by the light-filling component 50 may be prevented from having uneven brightness, and the uniformity of the display brightness of the area corresponding to the through hole 30 may be improved.

In one embodiment, the second microstructure 62 may include a Fresnel lens structure. It is understandable that the Fresnel lens structure has the following characteristics. The Fresnel lens can absorb light from different angles. The light from different angles may enter from one side of the Fresnel lens and exit from another side through the Fresnel lens. Correspondingly, the light may be focused into a point or may be emitted uniformly after changing to uniform light. By using the Fresnel lens structure, the light emitted from the Fresnel lens may be controlled to be uniform light. When the light-filling component 50 is composed of the plurality of light-filling lamps 51 as shown in FIG. 14, there may be a space between two adjacent light-filling lamps 51 and the brightness of the light emitted by the light-filling component 50 may be not uniform. In the present embodiment, the second microstructure 62 in the second optical film 70 may be configured to include a Fresnel lens, such that the uneven light emitted from the light-filling component 50 may be converted into uniform light after passing through the Fresnel lens. Then this part of the light may be emitted through the first optical film 40 to the display area corresponding to the through hole 30. The uniformity of the light in the display area corresponding to the through hole 30 may be improved. Uneven brightness in the display area corresponding to the through hole 30 induced by the uneven brightness of the light source provided by the light-filling component 50 may be avoided. The uniformity of the display brightness of the display area corresponding to the through hole 30 and the display effect may be improved.

Figure 15:
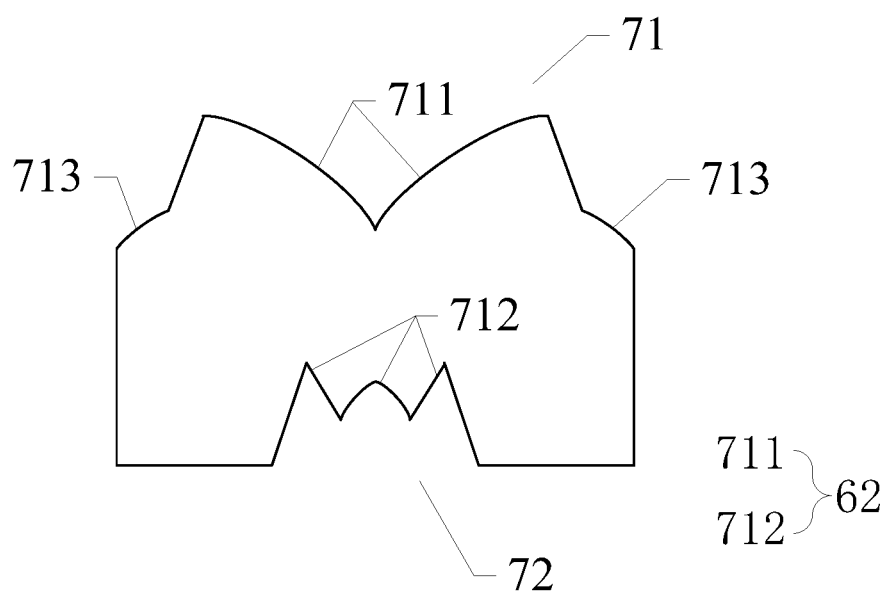
FIG. 15 illustrates an exemplary second optical film consistent with various disclosed embodiments in the present disclosure.

FIG. 15 illustrates a structure of the second optical film 70 provided by one embodiment of the present disclosure. As illustrated in FIG. 15, the second optical film 70 may include a first surface 71 and a second surface 72 opposite to each other. The first surface 71 may be disposed between the second surface 72 and the first optical film 40. The second microstructure 62 may include one or more first sawtooth structures 711 on the first surface 71 and one or more second sawtooth structures 712. The one or more first sawtooth structures 711 and at least one of the one or more second sawtooth structures 712 may include arc surfaces. The one or more first sawtooth structures 711 may protrude toward the light-filling component 50 and the one or more second sawtooth structures 712 may protrude toward the first optical film 40.

Specifically, as illustrated in FIG. 12, FIG. 13 and FIG. 15, in one embodiment, the second microstructure 62 may be disposed at two opposite surfaces, that is, the first surface 71 and the second surface 72, of the second optical film 70 along the direction perpendicular to the light-exiting surface of the display panel 10. The first surface 71 may be disposed between the second surface 72 and the first optical film 40, and the second surface 72 may be disposed between the first surface 71 and the light-filling component 50. The first surface 71 may be provided with the one or more first sawtooth structures 711 and the second surface 72 may be provided with the one or more second sawtooth structures 712. The one or more first sawtooth structures 711 may protrude toward the light-filling component 50, forming a concave saw tooth with a sharp angle. The one or more second sawtooth structures 712 may protrude toward the first optical film 40, forming an upward-protruding saw tooth with a sharp angle. As illustrated in FIG. 12, FIG. 13 and FIG. 15, the light from the light-filling component 50 may be transmitted to the one or more first sawtooth structures 711 after being processed through the second sawtooth structure 712, and then may exit from the surface of the first sawtooth structure 711. The one or more first sawtooth structures 711 and at least one of the one or more second sawtooth structures 712 may include arc surfaces. With such a design, the curved surface structure can disperse the light emitted by the light-filling component 50 to different areas, to reduce the amount of light directly above the plurality of light-filling lamps 51 in the light-filling component 50 and increases the amount of light directly above the position without the light-filling lamps. Correspondingly, uneven display brightness and darkness induced by uneven light transmitted to the display area corresponding to the through hole 30 may be avoided. The display brightness of the display area corresponding to the through hole 30 may be improved and also the uniformity of the display brightness of the display area corresponding to the through hole 30 may be improved.

In one embodiment, as illustrated in FIG. 15, two surfaces constituting one of the one or more first sawtooth structures 711 may be arc surfaces. Each of the one or more first sawtooth structures 711 may be a symmetric structure, that is, the two arc surfaces constituting one of the first saw-tooth structure 711 may be symmetrical to each other, such that the amount of the light emitted from the two arc surfaces may be more consistent. The uniformity of the light emitted through the second optical film 70 may be improved.

In one embodiment, as illustrated in FIG. 15, one second sawtooth structure 712 of the one or more second sawtooth structures 712 may include arc surfaces. The two surfaces constituting the one of the one or more second sawtooth structures 712 may be both arc surfaces, and the two arc surfaces may be symmetrical to each other, such that the amount of light emitted from the two curved surfaces to corresponding one of the one or more first sawtooth structures 711 may be more consistent. The uniformity of the light emitted from the second optical film 70 may be improved.

In some other embodiments, the first surface 71 of the second optical film 70 may be further provided with other arc structures. For example, as illustrated in FIG. 15, the first surface 71 may be further provided with an arc structures 713 arranged symmetrically on both sides of the one or more first sawtooth structures 711. Optionally, a radius of the circle corresponding to the arc structure 713 may be set to about 0.62 mm, and a central angle corresponding to the arc structure 713 may be set to about 25°. The arrangement of the arc-shaped structure 713 may be beneficial to adjusting the large-angle light emission of the light-filling component 50. That is, the large-angle light emitted by the light-filling component 50 can still be transmitted to the first optical film 40 through the above-mentioned arc structure, and then to the display area corresponding to the through hole 30. The effective utilization of the emitted light from the light-filling component 50 may be enhanced. The display brightness of the display area corresponding to the through hole 30 may be enhanced also, to improve the overall display effect of the display module 100.

In one embodiment, as illustrated in FIG. 13 and FIG. 15, the light-filling component 50 may include the plurality of light-filling lamps 51. An orthographic projection of each of the one or more second sawtooth structures 712 to the light-exiting surface of the display panel 10 may cover an orthographic projection of the plurality of light-filling lamps 51 to the light-exiting surface of the display panel 10.

In the present embodiment, the one or more second sawtooth structures 712 in the second optical film 70 adjacent to the light-filling component 50 may be configured to cover the area of the plurality of light-filling lamps 51 in the light-filling component 50, such that most of the light emitted from the plurality of light-filling lamps 51 can be transmitted to the second optical film 70. Correspondingly, the available light emitted from the plurality of light-filling lamps 51 may be increased and the utilization ratio of the light may be enhanced.

In one embodiment, as illustrated in FIG. 15, the second surface 72 may include three or more second sawtooth structures 712.

For description purposes only, one embodiment shown in FIG. 15 with the second optical film 70 including three second sawtooth structures 712 will be used as an example to illustrate the present disclosure. The middle one of the three second sawtooth structures 712 may include two arc surfaces, and the other two second sawtooth structures 712 may be symmetrically distributed on both sides of the middle second sawtooth structure 712 with the arc structure. Correspondingly, the three second sawtooth structures 712 can be used to converge and transmit the light emitted by the light-filling component 50, which is beneficial to simplify the manufacturing complexity of the second optical film 70. Of course, in some other embodiments of the present disclosure, the second surface 72 may be provided with more than three second sawtooth structures 712, for example, 5 or 7 second sawtooth structures 712. Among the 5 or 7 second sawtooth structures 712, the middle second sawtooth structure 712 may be an arc sawtooth structure and other second sawtooth structures 712 may be distributed on two sides of the middle second sawtooth structure 712 symmetrically, such that the light may exit the second sawtooth structures 712 evenly. For description purposes only, the present embodiment where the middle one of the second sawtooth structures 712 includes arc surfaces is used as an example to illustrate the present disclosure, and does not limit the scopes of the present disclosure. In some other embodiments, other second sawtooth structures 712 may also be configured to arc surface structures.

In one embodiment as illustrated in FIG. 15, the first surface 71 may be provided with one first sawtooth structure 711.

Specifically, the first surface 71 of the second optical film 70 may be provided with one first sawtooth structure 711. The structure with one first sawtooth structure 711 may simplify the fabrication of the second optical film 70. Optionally, the first sawtooth structure 711 may be a symmetrical structure, that is, two surfaces of the first sawtooth structure 711 may be configured symmetrically. Correspondingly, the light incident on the first sawtooth structure 711 from the one or more second sawtooth structures 712 may be emitted evenly from the two symmetrical surfaces of the first sawtooth structure 711. Even light may be provided to the display area corresponding to the through hole in the display stage, and the display effect of the display area corresponding to the through hole may be improved.

Figure 16:
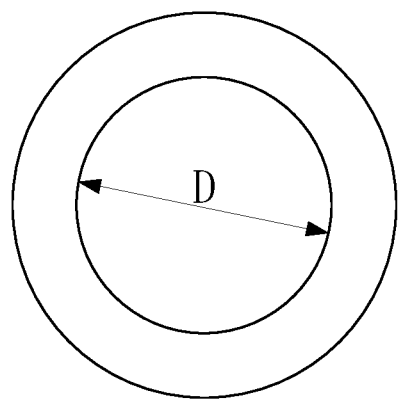
FIG. 16 illustrates an exemplary top view of the first optical film or the second optical film consistent with various disclosed embodiments in the present disclosure.
Figure 17:
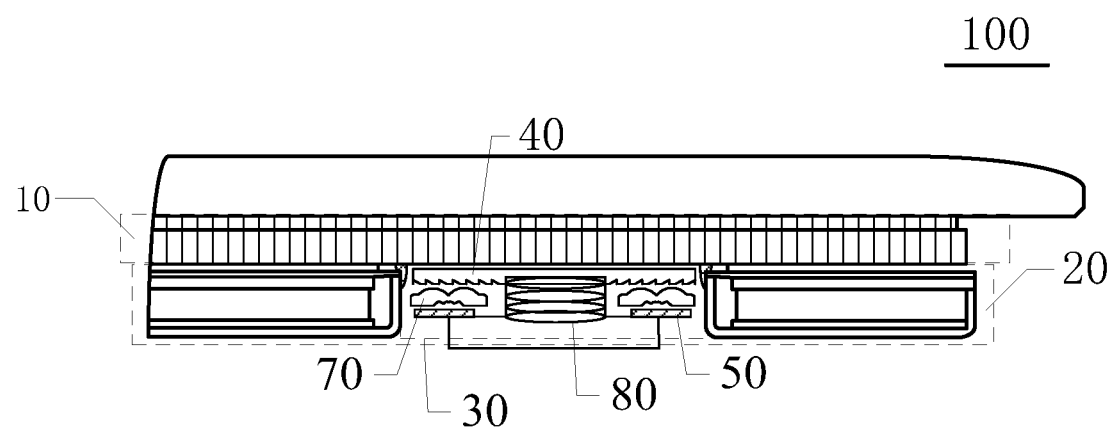
FIG. 17 illustrates another cross-section view of the display module along an A-A' direction in FIG. 1.

In another embodiment illustrated in FIG. 16 showing a top view of the first optical film 40 or the second optical film 70 and FIG. 17 showing a cross-sectional view of the display module 100 along the A-A' direction in FIG. 1, both the first optical film 40 and the second optical film 70 may be an annular optical film. The display module 100 may further include a photosensitive element 80. An inner diameter D of the first optical film 40 and an inner diameter D of the second optical film 70 may be both larger than an outer diameter of the photosensitive element 80.

Specifically, in the display module 100, both the first optical film 40 and the second optical film 70 may be disposed in the through hole 30. The photosensitive element 80 may also be disposed in the through hole 30. Both the first optical film 40 and the second optical film 70 may be a annular optical film shown in FIG. 16. That is, center parts of the first optical film 40 and the second optical film 70 may be hollow structures. Along the direction perpendicular to the light-exiting surface of the display panel 10, the first optical film 40 and the second optical film 70 may be laminated. In the present disclosure, the inner diameters of the first optical film 40 and the second optical film 70 may both be larger than the outer diameter of the photosensitive element 80. When the photosensitive element 80 is disposed in the through hole 30, the photosensitive element 80 may be able to pass through the hollow structures of the first optical film 40 and the second optical film 70, preventing the introduction of the first optical film 40 and the second optical film 70 from interfering the installation of the photosensitive element 80.

Optionally, the outer diameters of the first optical film 40 and the second optical film 70 may both be smaller than or equal to the inner diameter of the through hole 30, such that the first optical film 40 and the second optical film 70 may be easily installed in the through hole. The interference on the installation of the first optical film 40 and the second optical film 70 by the inner sidewalls of the through hole 30 may be avoided.

In one embodiment shown in FIG. 17, when the photosensitive element 80 is in an open state, the light-filling component 50 may be in a closed state; when the photosensitive element 80 is in the closed state, the light-filling component 50 may be in the open state.

Specifically, in the display module 100 provided by the present embodiment, when the photosensitive element 80 is in the open state, the light-filling component 50 may be in the closed state, and when the photosensitive element 80 is in the closed state, the light-filling component 50 may be in the open state. Optionally, the photosensitive element 80 may be a camera, and when the display device 200 is in a photographing state, the light-filling component 50 may be in the closed state, which can prevent the light emitted by the light-filling component 50 from affecting the operation of the camera. In the display phase, the light-filling component 50 may be in the open state to enhance the display brightness of the display area corresponding to the first hollowed portion 44 and improve the display uniformity of the display panel 10. The display effect of the display panel 10 may be improved. Further, the area corresponding to the photosensitive element 80, that is, the area corresponding to the camera may be used for the display area, which can increase the screen-to-body ratio of the display panel 10 and is beneficial to realize the narrow frame of the display panel 10.

Figure 18:
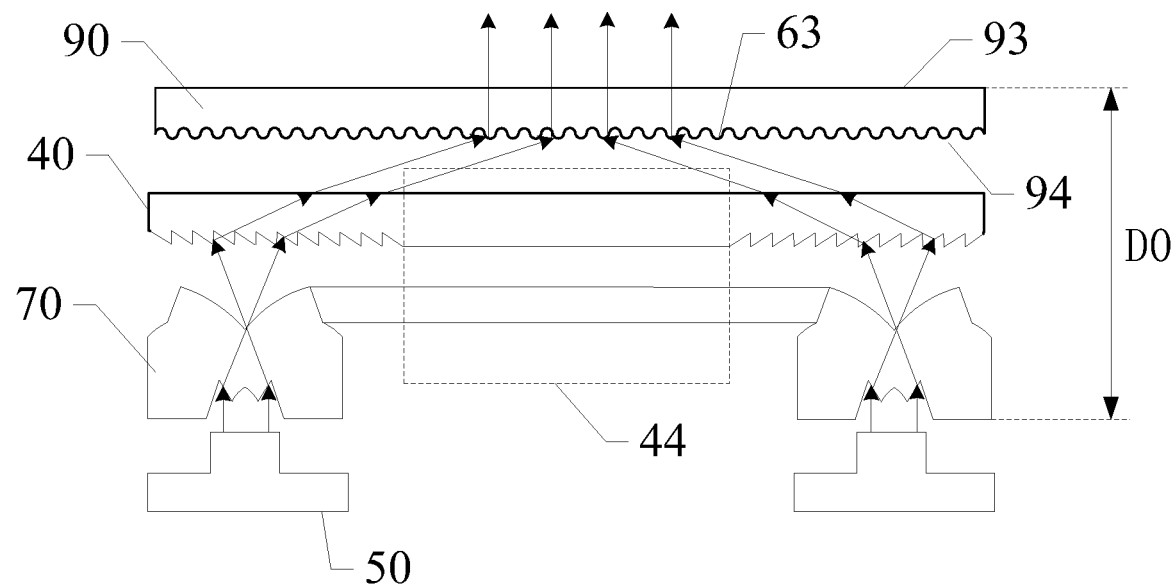
FIG. 18 illustrates an exemplary structure of a through hole where the first optical film, the second optical film, and the third optical film are disposed simultaneously.

In one embodiment, the display module 100 may further include a third optical film 90. FIG. 18 shows a structure where the first optical film 40, the second optical film 70, and the third optical film 90 are simultaneously disposed in the through hole. As illustrated in FIG. 17 and FIG. 18, the third optical film 90 may be disposed at a side of the first optical film 40 away from the light-filling component 50, and may be disposed inside the through hole 30. The third optical film 90 may be a planar structure, including a third surface 93 and a fourth surface 94 disposed oppositely. The fourth surface 94 may be located between the third surface 93 and the first optical film 40. The third surface 93 may be parallel to the light-exiting surface of the display panel 10. The fourth surface 94 may be provided with a third microstructure 63, such that the light emitted from the first optical film 40 may be emitted in a direction perpendicular to the third surface 93 after passing through the third microstructure 63.

Specifically, in the present embodiment, the third optical film 90 may be disposed at a side of the first optical film 40 away from the second optical film 70, that is, may be disposed at a side of the first optical film 40 close to the display panel 10. The light emitted by the light-filling component 50 may pass through the second optical film 70, the first optical film 40 and the third optical film 90 in sequence, and then may be directed to the display area corresponding to the through hole, to provide light to the display area corresponding to the through hole in the display panel. The third optical film 90 provided by the embodiment of the present disclosure may be a planar structure, that is, no hollow structure may be provided on the third optical film 90. The hollow structures on the first optical film 40 and the second optical film 70 may correspond to the position of the first hollowed portion 44 in FIG. 18. The third surface 93 of the third optical film 90 facing the display panel 10 may be parallel to the light-exiting surface of the display panel 10, and the fourth surface 94 of the third optical film 90 facing the first optical film 40 may be provided with the third microstructure 63. The light emitted from the first optical film 40 to the third optical film 90 may be emitted in a direction perpendicular to the third surface 93 after passing through the third microstructure 63, that is, be emitted in a direction perpendicular to the light-exiting surface of the display panel 10. When the direction of the light emitted from the third optical film 90 is not perpendicular to the extending direction of the light-exiting surface of the display panel 10, the light may be directed to a position in the display panel 10 that does not correspond to the through hole 30, that is, it is directed to other display areas not corresponding to the through hole 30. In the present embodiment, the third microstructure 63 may be provided on the fourth surface 94 of the third optical film 90, such that the light emitted from the third optical film 90 is perpendicular to the light-exiting surface of the display panel 10, which is beneficial to ensure that most of the light from the third optical film 90 is directed to the display area corresponding to the through hole 30. The light may be used to a greater extent, thereby more effectively improving the display brightness of the display area corresponding to the through hole 30. The brightness difference between the display area corresponding to the through hole 30 and other display areas may be reduced, to improve the overall display brightness uniformity of the display module 100.

In one embodiment, as illustrated in FIG. 17 and FIG. 18, the third microstructure 63 may include a wave-shaped structure.

Specifically, when the third microstructure 63 on the fourth surface 94 of the third optical film 90 may be set to a wave-shaped structure. Correspondingly, the light directed to the fourth surface 94 of the third optical film 90 may be reflected by the wave-shaped structure and then may be emitted in a direction perpendicular to the light-exiting surface of the display panel 10. The manufacturing process of forming a wave-shaped structure on the fourth surface 94 of the third optical film 90 may be relatively simple. Therefore, the difficulty of manufacturing the third optical film 90 may be reduced and the function of adjusting the light path may be achieved simultaneously, such that the light may be emitted from the display area corresponding to the through hole 30 along the direction perpendicular to the light-exiting surface of the panel 10. The display brightness of the display area corresponding to the through hole 30 in the display stage may be improved.

Figure 19:
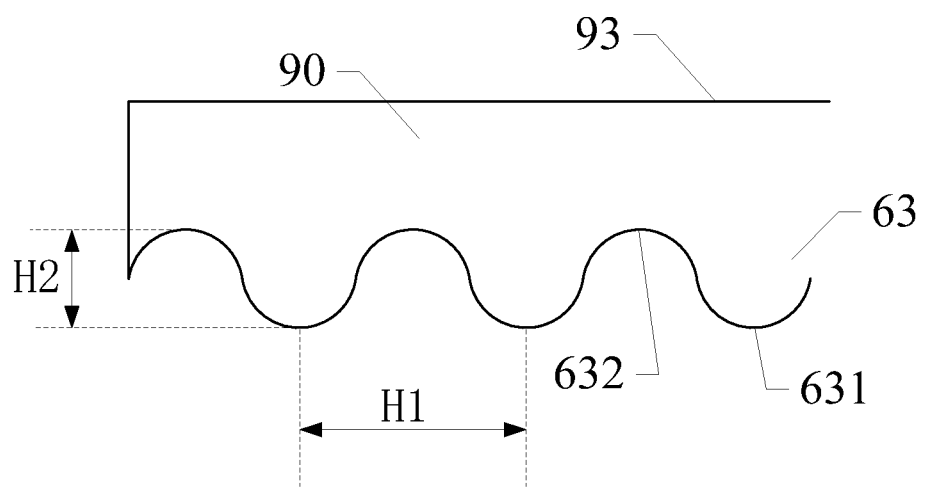
FIG. 19 illustrates a locally magnified schematic diagram of a wave-shaped structure in FIG. 18.

In one embodiment in FIG. 19 showing a locally enlarged view of the wave-shaped structure in FIG. 18, the wave-shaped structure may include wave crests 631 and wave troughs 632. Along the direction parallel to the third surface 93, the distance between two adjacent wave crests 631 may be H1 and the distance between a wave crest 631 and an adjacent trough 632 may be H2, with $0.02 \text{ mm} \leq H1 \leq 0.04 \text{ mm}$ and $0.013 \text{ mm} \leq H2 \leq 0.015 \text{ mm}$.

Specifically, in the third optical film 90 provided by the present embodiment, the wave-shaped structure correspondingly includes a plurality of wave crests 631 and wave troughs 632. The distance between two adjacent wave crests 631 along the direction parallel to the third surface 93 may be set to 0.02 mm-0.04 mm, and the distance between a crest 631 and an adjacent trough 632 in the direction perpendicular to the third surface 93 may be set to 0.013 mm-0.015 mm. The difficulty in the fabrication process of the third optical film 90 induced by a too small distance (for example, less than 0.02 mm) between two adjacent wave crests 631 or a too small distance between a crest 631 and an adjacent trough 632 (for example, less than 0.013 mm). Also, a problem that part of the light cannot be emitted in the direction perpendicular to the light-exiting surface of the display panel 10 when the distance between two adjacent wave crests 631 along the direction parallel to the third surface 93 is too large or the distance between a crest 631 and an adjacent trough 632 in the direction perpendicular to the third surface 93 is too large, can be avoided. Therefore, in the present embodiment, the distance between two adjacent crests 631 in the third microstructure 63 may be is set to $0.02 \text{ mm} \leq H1 \leq 0.04 \text{ mm}$, and the distance between a crest 631 and an adjacent trough 632 may be set to $0.013 \text{ mm} \leq H2 \leq 0.015 \text{ mm}$. The manufacturing process of the third optical film 90 may be simplified, and it also may be ensured that most of the light emitted from the first optical film 40 to the third optical film 90 can be emitted in the direction perpendicular to the light-exiting surface of the display panel 10, to enhance the amount of light in the display area corresponding to the through hole 30. Correspondingly, the display brightness of the display area corresponding to the through hole 30 in the display stage may be increased, and the difference in display brightness with other display areas may be reduced. Optionally, H1 can be 0.025 mm, 0.03 mm, or 0.035 mm; H2 can be 0.014 mm and so on.

Optionally, as illustrated in FIG. 18 and FIG. 19, the wave-shaped structure on the fourth surface 94 of the third optical film 90 can be embodied as a regular sine wave structure. The regular structure may be more conducive to reducing the difficulty of manufacturing the third optical film 90 and to the realization of massive production of the third optical film 90.

In one embodiment, as illustrated in FIG. 17 and FIG. 18, along the direction perpendicular to the light-exiting surface of the display panel 10, the distance between the third surface 93 of the third optical film 90 and the surface of the second optical film 70 away from the first optical film 40 may be D0 with $1.1 \text{ mm} \leq D0 \leq 1.4 \text{ mm}$.

Specifically, when the first optical film 40, the second optical film 70, and the third optical film 90 are simultaneously disposed in the through hole 30 of the display module 100, there may be a gap between the first optical film 40 and the second optical film 70. The second optical film 70 and the third optical film 90 may be bonded by optical glue. The distance between the third surface 93 of the third optical film 90 and the surface of the second optical film 70 away from the first optical film 40 may include the thickness of the first optical film 40, the second optical film 70, and the third optical film 90, and also includes the thickness of the optical glue the first optical film 40 and the second optical film 70 and the optical glue between the first optical film 40 and the third optical film 90. The present disclosure may set the total thickness of these film layers to be 1.1 mm-1.4 mm. The problems that the optical path cannot be effectively changed induced by the too small total thickness and too thin optical films. Also, the problem that the total thickness is too large and exceeds the depth of the through hole 30, which leads to an increase in the overall thickness of the display module 100, may be avoided. Therefore, along the direction perpendicular to the light-exiting surface of the display panel 10, the distance between the third surface 93 of the third optical film 90 and the surface of the second optical film 70 away from the first optical film 40 may be D0 with $1.1 \text{ mm} \leq D0 \leq 1.4 \text{ mm}$. The optical characteristics of the first optical film 40, the second optical film 70, and the third optical film 90 may be ensured to achieve the reliable adjustment of the optical path, and the problem that the overall thickness of the display module 100 increases significantly induced by the deployment of these optical films may be avoided. The realization of the thinning demand of the display module 100 may be met. Optionally, the total thickness D0 can be set to about 1.24 mm, for example, 1.24±0.07 mm.

In one embodiment, the thickness of the first optical film 40 and the third optical film 90 may be set to about 0.12 mm, for example, 0.12±0.02 mm, and the thickness of the second optical film 70 may be set to about 0.8 mm, for example, 0.8±0.05 mm.

In one embodiment, the first optical film 40, the second optical film 70, and the third optical film 90 may be made of a material including polyethylene terephthalate. The present disclosure has no limit on this.

Figure 20:
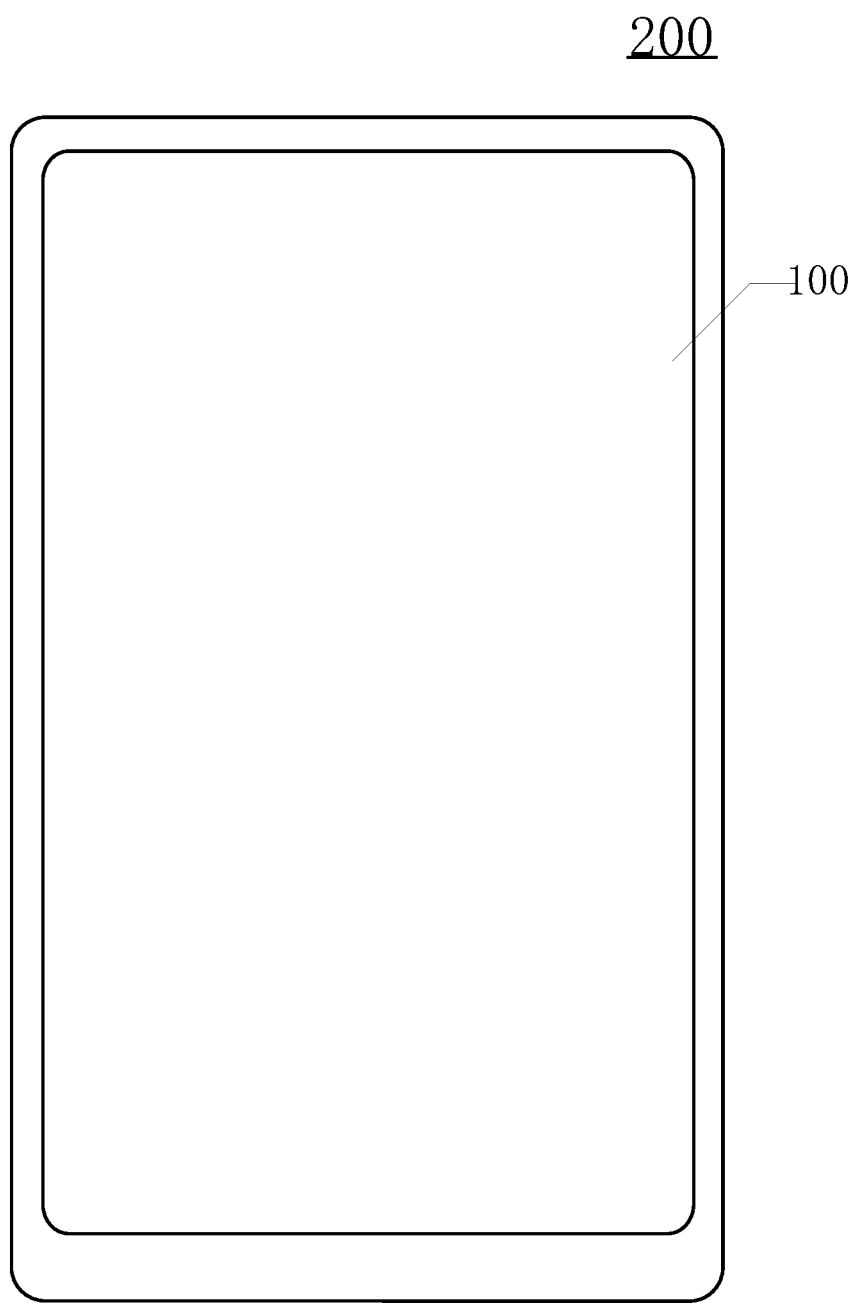
FIG. 20 illustrates an exemplary display device consistent with various disclosed embodiments in the present disclosure.

The present disclosure also provides a display device. As illustrated in FIG. 20, the display device 200 may include a display module 100 provided by various embodiments of the present disclosure. In the display device 200 provided by the present disclosure, the first microstructure 61 may be disposed on the first optical film 40, and may be used to adjust the optical path of the light from the light-filling component 50, such that more light may be directed to the area corresponding to the first hollowed portion 44. Correspondingly, the display brightness of the display area corresponding to the through hole 30 may be enhanced, and the uniformity of the display brightness of the display area corresponding to the through hole 30 and the normal display area in the display device 200 may be improved, to improve the display effect of the display device 200 in the display stage. Further, the area corresponding to the through hole 30 can play a display role in the display stage. Correspondingly, the screen-to-body ratio of the display device 200 may be increased to realize the narrow frame design of the display module 100.

In various embodiments, the display device in the present disclosure may be any product or device that has a display function, including a cell phone, a tablet computer, a television, a monitor, a laptop, a digital photo frame, or a navigator.

In the display modules and the display devices provided by the present disclosure, the first optical film and the light-filling component may be provided, and the first hollowed portion may penetrate through the first optical film perpendicular to the light-exiting surface of the display panel. The functional device may be inserted into the first hollowed portion. When the functional device is in operation, more light from outside can enter the functional device. The first hollowed portion may prevent the first optical film from obstructing the outside light from entering the functional device. At least a portion of the light from the light-filling component may be incident into the first hollowed portion and be transmitted to the display panel after passing through the first microstructure of the first optical film. The light path of light from the light-exiting component may be changed by the first microstructure, such that more light may be directed into the first hollowed portion and the first hollow part is filled with light. Uniformity of the brightness of the display area corresponding to the first hollowed portion and the brightness of the surrounding display area may be improved. The display effect of the display panel may be improved and at the same time the realization of a narrow frame of the display panel may be facilitated.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display module, comprising:
    a display panel;
    a backlight module at a side away from a light-exiting surface of the display panel;
    a through hole penetrating through the backlight module along a direction perpendicular to the light-exiting surface of the display panel; and
    a first optical film;
    a diffuser located between the display panel and the first optical film, wherein the diffuser and the first optical film have a same annular shape surrounding a hollow portion formed in the first optical film and the diffuser; and
    a light-filling component, wherein:
        the first optical film is disposed at a side of the display panel close to the light-filling component;
        an orthographic projection of the first optical film on the display panel is located inside an orthographic projection of the through hole on the display panel;
        a first microstructure is disposed on a side of the first optical film facing the light-filling component;
        the first optical film further includes a first hollowed portion penetrating through the first optical film along the direction perpendicular to the light-exiting surface of the display panel;
        light emitted by the light-filling component at least partially enters the first hollowed portion through the first optical film, and then is transmitted to the display panel; and
        the first microstructure includes a plurality of annular substructures, and a center of each of the plurality of annular substructures is located in the first hollowed portion.

2. The display module according to claim 1, wherein the first microstructure is a sawtooth first microstructure, and the sawtooth first microstructure includes at least one first side surface, wherein the at least one first side surface is flat and is inclined in a direction away from the first hollowed portion.

3. The display module according to claim 2, wherein:
    the sawtooth first microstructure further includes at least one second side surface perpendicular to the light-exiting surface of the display panel; and
    the at least one first side surface deviates from the at least one second side surface along a direction pointing to the first hollowed portion at an acute angle.

4. The display module according to claim 3, wherein:
    a surface of the first optical film away from the light-filling component is parallel to the light-exiting surface of the display panel;
    the at least one first side surface and the at least one second side surface are connected to form a plurality of saw teeth; and
    in any adjacent two saw teeth of the plurality of saw teeth, a first side surface of the at least one first side surface and an adjacent second side surface of the at least one second side surface are connected.

5. The display module according to claim 4, wherein:
    the angle between the at least one second side surface and the at least one first side surface is about 20° to about 40°.

6. The display module according to claim 4, wherein a thickness of the first optical film along the direction perpendicular to the light-exiting surface of the display panel is about 0.1 mm to about 0.15 mm.

7. The display module according to claim 3, wherein:
    a third side surface is disposed between a first side surface of the at least one first side surface and an adjacent second side surface of the at least one second side surface;
    the third side surface is parallel to the light-exiting surface of the display panel;
    the third side surface is connected to each of an adjacent first side surface of the at least one first side surface and an adjacent second side surface of the at least one second side surface; and
    a side surface of the first optical film away from the light-filling component is parallel to the light-exiting surface of the display panel.

8. The display module according to claim 7, wherein:
the diffuser is provided at the side of the display panel close to the light-filling component; and
an orthographic projection of the first optical film on the display panel is located within an orthographic projection of the diffuser on the display panel.

9. The display module according to claim 3, wherein:
the first optical film includes a first sub-film layer and a second sub-film layer;
the second sub-film layer is located on a side of the first sub-film layer close to the display panel;
the sawtooth first microstructure is provided at a side of the first sub-film layer close to the light-filling component;
in the sawtooth first microstructure, one first side surface of the at least one first side surface is disposed between two adjacent second side surfaces of at least one second side surface;
the second sub-layer film includes a first reflecting surface; and
the first reflecting surface deviates from a plane of the at least one second side surface in a direction away from the first hollowed portion at an acute angle.

10. The display module according to claim 1, further including a third optical film, wherein:
the third optical film is located on the side of the first optical film away from the light-filling component and in the through hole;
the third optical film includes a planar structure including a third surface and a fourth surface opposite to the third surface;
the fourth surface is located between the third surface and the first optical film;
the third surface is parallel to the light-exiting surface of the display panel;
the fourth surfaces are provided with a third microstructure; and
the light emitted from the first optical film passes through the third microstructure and then exits in a direction perpendicular to the third surface.

11. The display module according to claim 10, wherein:
the wave-shaped structure includes wave crests and wave troughs;
along a direction parallel to the third surface, a distance between two adjacent wave crests is H1;
along a direction perpendicular to the third surface, a distance between one wave crest and an adjacent wave trough is H2; and
0.02 mm≤H1≤0.04 mm, and 0.013 mm≤H2≤0.015 mm.

12. The display module according to claim 10, wherein:
along the direction perpendicular to the light-exiting surface of the display panel, a distance between the third surface of the third optical film and a surface of the second optical film away from the first optical film is D0; and
1 mm≤D0≤1.4 mm.

13. The display module according to claim 1, wherein:
the center of each of the plurality of annular substructures coincides with a center of the first hollowed portion.

14. A display module, comprising:
a display panel;
a backlight module at a side away from a light-exiting surface of the display panel;
a through hole penetrating through the backlight module along a direction perpendicular to the light-exiting surface of the display panel; and
a first optical film;
a second optical film; and
a light-filling component, wherein:
the first optical film is disposed at a side of the display panel close to the light-filling component;
an orthographic projection of the first optical film on the display panel is located inside an orthographic projection of the through hole on the display panel;
a first microstructure is disposed on a side of the first optical film facing the light-filling component;
the first optical film further includes a first hollowed portion penetrating through the first optical film along the direction perpendicular to the light-exiting surface of the display panel;
light emitted by the light-filling component at least partially enters the first hollowed portion through the first optical film, and then is transmitted to the display panel;
the first microstructure includes a plurality of annular substructures, and a center of each of the plurality of annular substructures is located in the first hollowed portion;
along the direction perpendicular to the light-exiting surface of the display panel, the second optical film is disposed between the light-filling component and the first optical film, and inside the through hole;
the second optical film is provided with a second microstructure; and
at least a portion of the light from the light-filling component enters the first optical film through the second microstructure.

15. The display module according to claim 14, wherein:
the second optical film includes a first surface and a second surface that are opposed to each other;
the first surface is located between the second surface and the first optical film;
the second microstructure includes one or more first sawtooth structures on the first surface and one or more second sawtooth structures on the second surface;
the one or more first sawtooth structures include arc surfaces;
at least one of the one or more second sawtooth structures includes arc surfaces; and
each of the one or more first sawtooth structures is convex toward the light-filling component, and each of the one or more second sawtooth structures is convex toward the first optical film.

16. The display module according to claim 15, wherein:
the light-filling component includes light-filling lamps; and
orthographic projections of the one or more second sawtooth structures on the light-exiting surface of the display panel cover orthographic projections of the light-filling lamps on the light-exiting surface of the display panel.

17. The display module according to claim 15, wherein:
three or more second sawtooth structures are provided on the second surface.

18. The display module according to claim 15, wherein:
the one or more first sawtooth structures on the first surface include only one first sawtooth structure.

19. The display module according to claim 15, wherein:
the first optical film and the second optical film are both annular optical films;
the display module further includes a photosensitive element disposed in the through hole; and inner diameters the first optical film and the second optical film are larger than an outer diameter of the photosensitive element.

20. A display device, comprising a display module, wherein:

the display module includes:

a display panel;

a backlight module at a side away from a light-exiting surface of the display panel;

a through hole penetrating through the backlight module along a direction perpendicular to the light-exiting surface of the display panel;

a diffuser located between the display panel and the first optical film, wherein the diffuser and the first optical film have a same annular shape surrounding a hollow portion formed in the first optical film and the diffuser; and a first optical film and a light-filling component, wherein:

the first optical film is disposed at a side of the display panel close to the light-filling component;

an orthographic projection of the first optical film on the display panel is located inside an orthographic projection of the through hole on the display panel;

the first optical film is provided with a first microstructure on a side facing the light-filling component;

the first optical film further includes a first hollowed portion penetrating through the first optical film along direction perpendicular to the light-exiting surface of the display panel;

light emitted by the light-filling component at least partially enters the first hollowed portion through the first optical film, and then is transmitted to the display panel; and the first microstructure includes a plurality of annular substructures, and a center of each of the plurality of annular substructures is located in the first hollowed portion.

* * * * *